(12) United States Patent
Seo et al.

(10) Patent No.: US 11,150,856 B2
(45) Date of Patent: Oct. 19, 2021

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Jeongryeol Seo, Suwon-si (KR); Sangwon Kim, Suwon-si (KR); Youngkook Kim, Suwon-si (KR); Hyewon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/458,328

(22) Filed: Jul. 1, 2019

(65) Prior Publication Data

US 2020/0004491 A1    Jan. 2, 2020

(30) Foreign Application Priority Data

Jul. 2, 2018   (KR) .................. 10-2018-0076562

(51) Int. Cl.
*G06F 3/14*   (2006.01)
*H04N 9/12*   (2006.01)

(52) U.S. Cl.
CPC ............ *G06F 3/1446* (2013.01); *H04N 9/12* (2013.01); *G09G 2340/04* (2013.01); *G09G 2360/04* (2013.01); *G09G 2360/06* (2013.01)

(58) Field of Classification Search
CPC .... G06F 3/1446; H04N 9/12; G09G 2340/04; G09G 2340/0407; G09G 2370/12; G09G 2370/20; G09G 2356/00; G09G 2360/04; G09G 2360/06

USPC .............................................. 345/1.1–1.3, 10
See application file for complete search history.

(56) References Cited

U.S. PATENT DOCUMENTS

| 2004/0008155 A1* | 1/2004 | Cok ...................... G06F 3/1446 |
| | | 345/1.3 |
| 2005/0125488 A1 | 6/2005 | Kulkarni et al. |
| 2005/0134526 A1* | 6/2005 | Willem ................... G06F 3/147 |
| | | 345/1.3 |

(Continued)

FOREIGN PATENT DOCUMENTS

| JP | 2007-193135 A | 8/2007 |
| KR | 10-0172330 B1 | 3/1999 |

(Continued)

OTHER PUBLICATIONS

International Search Report (PCT/ISA/210) dated Oct. 17, 2019 issued by the International Searching Authority in International Application No. PCT/KR2019/008010.

(Continued)

*Primary Examiner* — Jimmy H Nguyen
(74) *Attorney, Agent, or Firm* — Sughrue Mion, PLLC

(57) ABSTRACT

An electronic apparatus includes an interface connected to a modular display apparatus, and a processor scales an image signal received from an external device to a predetermined resolution, divides each display module among a plurality of display modules included in the modular display into a plurality of groups in a first direction, decomposes the scaled image signal to image signals corresponding to each of the plurality of groups, and transmits the decomposed image signals to each of the plurality of groups via the interface connected to each of the plurality of groups.

15 Claims, 14 Drawing Sheets

(56) References Cited

U.S. PATENT DOCUMENTS

| | | | |
|---|---|---|---|
| 2007/0065010 A1* | 3/2007 | Shie | G09G 3/001 |
| | | | 382/173 |
| 2008/0211825 A1* | 9/2008 | Sunakawa | G06F 3/1446 |
| | | | 345/581 |
| 2009/0015513 A1 | 1/2009 | Kim et al. | |
| 2010/0123732 A1* | 5/2010 | Jenks | G06F 3/1446 |
| | | | 345/592 |
| 2011/0229106 A1 | 9/2011 | Cho | |
| 2011/0242425 A1 | 10/2011 | Zeng | |
| 2012/0242893 A1* | 9/2012 | Akitomo | G06F 3/1446 |
| | | | 348/441 |
| 2017/0115946 A1* | 4/2017 | Kim | G06F 3/147 |
| 2018/0018931 A1 | 1/2018 | Zhang | |

FOREIGN PATENT DOCUMENTS

| | | |
|---|---|---|
| KR | 10-0436420 B1 | 6/2004 |
| KR | 10-2005-0065355 A | 6/2005 |
| KR | 10-2012-0000688 A | 1/2012 |
| KR | 10-1146331 B1 | 5/2012 |
| WO | 2007113471 A1 | 10/2007 |

OTHER PUBLICATIONS

Written Opinion (PCT/ISA/237) dated Oct. 17, 2019, issued by the International Searching Authority in International Application No. PCT/KR2019/008010.

Communication dated May 6, 2021, from the European Patent Office in European Application No. 19830340.6.

* cited by examiner

ELECTRONIC APPARATUS AND METHOD FOR CONTROLLING THEREOF

CROSS-REFERENCE TO RELATED APPLICATIONS

This application claims is based on and claims priority under 35 U.S.C. § 119 to Korean Patent Application No. 10-2018-0076562, filed on Jul. 2, 2018, in the Korean Intellectual Property Office, the disclosure of which is incorporated by reference herein in its entirety.

BACKGROUND

Field

The disclosure relates to an electronic apparatus and a method for controlling the electronic apparatus and, more particularly, to an electronic apparatus that transmits an image signal to a display apparatus and a method for controlling the electronic apparatus.

Description of Related Art

Recently, with the development of electronic technology, various electronic devices meeting consumer needs have been developed. In particular, a large display device connecting a plurality of display modules has been developed.

Such large display devices provide an image by receiving an image signal from an external electronic device via an interface of a display module arranged at one corner, and sequentially transmitting the received image signal to another adjacent display module.

However, when a large display device is connected to an external electronic device via one interface, the external electronic device needs to have an interface with a channel bandwidth of a sufficient size, in order to transmit a high-definition image, such as a 4K image or an 8K image.

However, the interface of an external electronic device, such as a conventional set-top box for transmitting an image to a large display device, has a problem in that the interface does not have a channel bandwidth of a sufficient size capable of transmitting an image signal with high definition.

SUMMARY

Embodiments may overcome the above disadvantages and other disadvantages not described above. Also, an embodiment is not required to overcome the disadvantages described above, and an embodiment may not overcome any of the problems described above.

In accordance with an aspect of the disclosure, there is provided an electronic apparatus including an interface connected to a modular display apparatus; and a processor configured to: scale an image signal received from an external device to a predetermined resolution, divide each display module among a plurality of display modules included in the modular display apparatus into a plurality of groups in a first direction, decompose the scaled image signal to image signals corresponding to each of the plurality of groups, and transmit the decomposed image signals to each of the plurality of groups via the interface connected to each of the plurality of groups.

The interface may include a plurality of ports that are connected to the modular display apparatus, and the processor may be further configured to: based on a number of the plurality of ports that are connected to the modular display apparatus, divide the plurality of display modules into the plurality of groups, and transmit the decomposed image signals to each of the plurality of groups through each of the plurality of ports.

The processor may be further configured to: divide the plurality of groups divided in the first direction into a plurality of sub-groups in a second direction, decompose the scaled image signal to image signals corresponding to each of the plurality of sub-groups, and transmit the decomposed image signals to each of the plurality of sub-groups via the interface connected to each of the plurality of sub-groups.

The interface may include a plurality of ports connected to the modular display apparatus, and the processor may be further configured to: based on a number of the plurality of ports connected to the modular display apparatus and a position of each of the plurality of connected ports, divide the plurality of display modules into the plurality of sub-groups and transmit the decomposed image signals to each of the plurality of sub-groups through each of the plurality of ports.

The processor may be further configured to: identify a resolution of an image provided by the plurality of sub-groups connected to each of the plurality of ports, rescale an image signal that is scaled to a predetermined resolution to the identified resolution, decompose the rescaled image signal to image signals corresponding to each of the plurality of sub-groups, and transmit the decomposed image signals to each of the plurality of sub-groups through the ports connected to each of the plurality of sub-groups.

The processor may be further configured to encode image signals corresponding to each of the plurality of sub-groups into rows, and sequentially transmit the encoded image signals to each of the plurality of sub-groups.

The processor may be further configured to vertically synchronize the decomposed image signals and transmit the vertically synchronized image signals to each of the plurality of sub-groups.

A resolution of an image signal received from the external device may be 4K, and the processor may be further configured to scale the resolution of the received image signal to 8K resolution, decompose the image signal scaled to 8K to image signals corresponding to each of the plurality of groups, and transmit the decomposed image signals to each of the plurality of groups via the interface connected to each of the plurality of groups.

The electronic apparatus may further include a first sub-processor; and a second sub-processor, and the processor may be further configured to: divide the plurality of display modules included in the modular display apparatus into a first group and a second group in the second direction, decompose the scaled image signal to image signals corresponding to each of the first group and the second group, transmit an image signal corresponding to the first group to the first sub-processor, and transmit an image signal corresponding to the second group to the second sub-processor, wherein the first sub-processor may be configured to: divide the first group into a plurality of sub-groups in the first direction, decompose the image signal corresponding to the first group, transmit the decomposed image signal to each of the plurality of sub-groups via the interface connected to each of the plurality of sub-groups, and wherein the second sub-processor may be configured to: divide the second group into a plurality of sub-groups in the first direction, decompose the image signal corresponding to the second group, and transmit the decomposed image signal to each of the plurality of sub-groups via the interface connected to each of the plurality of sub-groups.

In accordance with an aspect of the disclosure, there is provided a method for controlling an electronic apparatus, the method including: scaling an image signal received from an external device to a predetermined resolution; dividing each display module a plurality of display modules included in the modular display apparatus into a plurality of groups in a first direction; decomposing the scaled image signal to image signals corresponding to each of the plurality of groups; and transmitting the decomposed image signals to each of the plurality of groups via an interface connected to each of the plurality of groups.

The interface may include a plurality of ports that are connected to the modular display apparatus, and wherein the transmitting may include, based on a number of the plurality of ports that are connected to the modular display apparatus, dividing the plurality of display modules into the plurality of groups, and transmitting the decomposed image signals to each of the plurality of groups through each of the plurality of ports.

The transmitting may include dividing the plurality of groups divided in the first direction into a plurality of sub-groups in a second direction, decomposing the scaled image signal to image signals corresponding to each of the plurality of sub-groups, and transmitting the decomposed image signals to each of the plurality of sub-groups via the interface connected to each of the plurality of sub-groups.

The interface may include a plurality of ports connected to the modular display apparatus, and wherein the transmitting may include, based on a number of the plurality of ports connected to the modular display apparatus and a position of each of the plurality of connected ports, dividing the plurality of display modules into the plurality of sub-groups and transmitting the decomposed image signals to each of the plurality of sub-groups through each of the plurality of ports.

The transmitting may include: identifying a resolution of an image provided by the plurality of sub-groups connected to each of the plurality of ports, rescaling an image signal that is scaled to a predetermined resolution to the identified resolution, decompose the rescaled image signal to image signals corresponding to each of the plurality of sub-groups, and transmitting the decomposed image signals to each of the plurality of sub-groups through the ports connected to each of the plurality of sub-groups.

The transmitting may include encoding image signals corresponding to each of the plurality of sub-groups into rows, and sequentially transmitting the encoded image signals to each of the plurality of sub-groups.

The transmitting may include vertically synchronizing the decomposed image signals and transmitting the vertically synchronized image signals to each of the plurality of sub-groups.

A resolution of an image signal received from the external device may be 4K, and wherein the transmitting may include scaling the resolution of the received image signal to 8K resolution, decomposing the image signal scaled to 8K to image signals corresponding to each of the plurality of groups, and transmitting the decomposed image signals to each of the plurality of groups via the interface connected to each of the plurality of groups.

In accordance with an aspect of the disclosure, there is provided an electronic apparatus including: an interface connected to a modular display apparatus; and a processor configured to: based on a number of a plurality of ports that are connected to the modular display apparatus, divide a plurality of display modules included in the modular display apparatus into a plurality of groups in a first direction and into a plurality of sub-groups in a second direction; identify a resolution of an image provided by the plurality of sub-groups connected to each of the plurality of ports; receive an image signal from an external device having a predetermined resolution; based on identifying that the predetermined resolution is different than the resolution of the image provided by the plurality of sub-groups connected to each of the plurality of ports, change the predetermined resolution of the image signal to correspond to the resolution of the image provided by the plurality of sub-groups; and divide the image signal into a plurality of image signals corresponding to the number of the plurality of the ports, and transmit the plurality of image signals to each of the plurality of sub-groups through each of the plurality of ports.

The first direction may be a vertical direction and the second direction may be a horizontal direction.

Each of the plurality of image signals may be transmitted simultaneously.

BRIEF DESCRIPTION OF THE DRAWING FIGURES

The above and/or other aspects, features, and advantages of certain embodiments of the disclosure will be more apparent from the following description taken in conjunction with the accompanying drawings, in which.

DETAILED DESCRIPTION OF THE EMBODIMENTS

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined on the basis of the meaning of the terms and the contents through out the disclosure rather than simple names of the terms.

When it is decided that a detailed description for the known art related to the disclosure may unnecessarily obscure the gist of the disclosure, the detailed description will be omitted.

Embodiments of the disclosure will be described in detail with reference to the accompanying drawings, but the disclosure is not limited to embodiments described herein.

Hereinafter, embodiments will be described in detail with reference to the drawings.

Embodiments relate to enabling a large display apparatus to display a high-definition image even through an electronic apparatus having a small channel bandwidth.

According to various embodiments, a high-definition image may be provided even through an electronic apparatus having a low specification interface.

In particular, an up-scaling technique for improving an image of at a low resolution to a high resolution is combined with an electronic apparatus, a user may view a low-resolution image as a high-resolution image through a large-sized display apparatus.

Figure 1A:
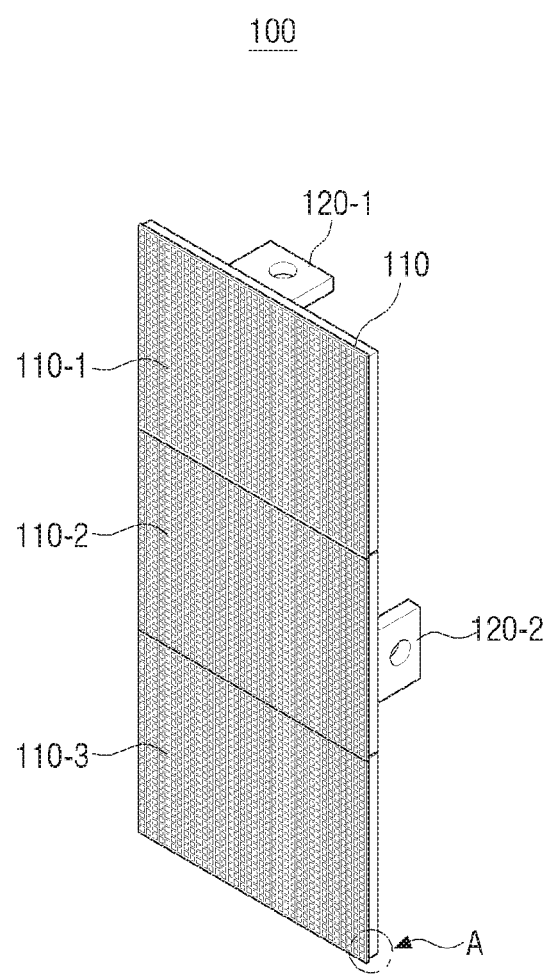
FIG. 1A is a view illustrating a cabinet, according to an embodiment.
Figure 1B:
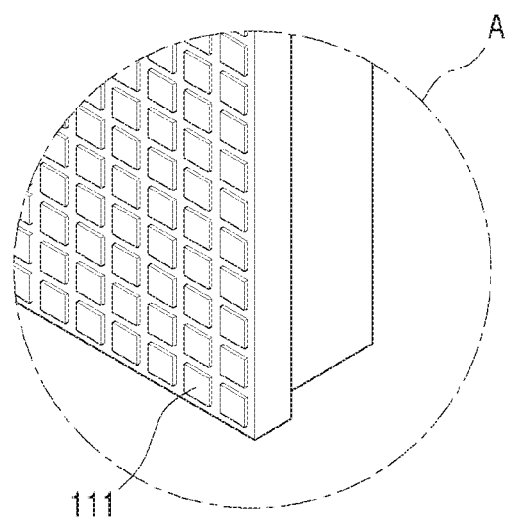
FIG. 1B is a view illustrating a cabinet, according to an embodiment.
Figure 1C:
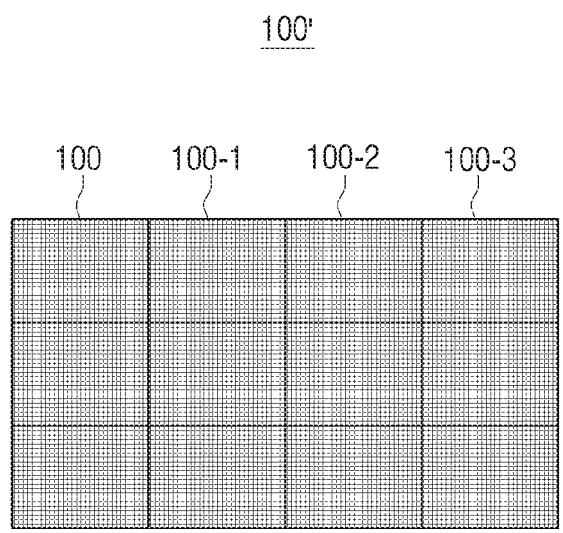
FIG. 1C is a view illustrating a cabinet, according to an embodiment.

FIGS. 1A to 1C are views illustrating a cabinet according to an embodiment.

Referring to FIG. 1A, a cabinet 100 according to an embodiment may include a plurality of display modules 110-1, 110-2, and 110-3. That is, the cabinet 100 may be implemented as a form to physically connect the plurality of display modules 110-1, 110-2, and 110-3.

Here, each of the plurality of display modules 110-1, 110-2, and 110-3 may be implemented as a light emitting diode (LED) display module including LEDs.

Specifically, referring to FIG. 1B, each of the plurality of display modules 110-1, 110-2, and 110-3 may be implemented as an LED display module that includes a plurality of LEDs 111 that implement red LED, green LED, and blue LED, which are sub-pixels, as one pixel.

Here, the plurality of pixels may be arranged in a matrix form (for example, M×N, where M and N are natural numbers). Specifically, the matrix may be in the same arrangement (e.g., M=N, where M and N are natural numbers, 16×16 format, 24×24 format, etc.), or may be another arrangement (e.g., M≠N, where M and N are natural numbers).

According to an embodiment, the LED of the LED display module may be implemented as a micro LED. Here, the micro LED may be an LED having a size about 5 to 100 micrometers, and may be a superminiature light emitting element that emits light by itself without a color filter.

However, the LED display module is merely an example, and the display module may be implemented as an organic LED (OLED), an active matrix OLED (AMOLED), a plasma display panel (PDP), or the like. Hereinafter, for convenience of description, it is assumed that the display module according to an embodiment is the LED display module.

Referring back to FIG. 1A, the cabinet 100 according to an embodiment may be implemented in a form in which the plurality of display modules 110-1, 110-2, and 110-3 are combined in a 1×3 format. That is, a plurality of display modules included in one cabinet 100 may be arranged in a vertical direction.

The LED display module in a 1×3 format is merely an example, and the arrangement format and the number of the LED display module may change in a diverse manner.

The cabinet 100 may include a base plate capable of mounting a plurality of display modules 110-1, 110-2, and 110-3, respectively. Here, the base plate may be implemented in a manner that each display module may be mounted on the front surface of the base plate. Accordingly, the cabinet 100 according to an embodiment may be implemented to be bezel-less, and a modular display apparatus 100' in which a plurality of cabinets are combined may display a seamless image that has no disconnection between cabinets when displaying an image.

The cabinet 100 according to an embodiment may include a plurality of couplers 120-1 and 120-2 for coupling the cabinet 100 with one or more other cabinets. Accordingly, the cabinet 100 according to an embodiment may be implemented as a modular display apparatus 100' through coupling with one or more cabinets.

For example, referring to FIG. 1C, the cabinet 100 according to an embodiment may be coupled to a plurality of other cabinets 100-1, 100-2, and 100-3 in a 4×1 format, and the modular display apparatus 100' such as a video wall may be implemented. Meanwhile, the modular display apparatus in a 4×1 format is only an embodiment, and the arrangement and the number of the modular display apparatus may be changed in a diverse manner.

Figure 2:
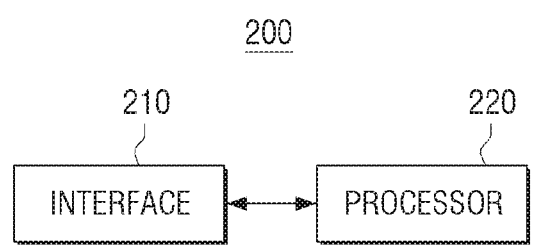
FIG. 2 is a block diagram illustrating an electronic apparatus, according to an embodiment.

FIG. 2 is a block diagram illustrating an electronic apparatus according to an embodiment.

Referring to FIG. 2, an electronic apparatus 200 according to an embodiment includes an interface 210 and a processor 220.

The interface 210 may be connected to the modular display apparatus 100'. Here, the modular display apparatus 100' may be a display apparatus that physically connects the plurality of cabinets 100, 100-1, 100-2, and 100-3.

The interface 210 may be connected to the modular display apparatus 100' through a port. To be specific, the interface 210 may be connected to the modular display apparatus 100' through a cable connected to the port. Here, the cable may be a high definition multimedia interface (HDMI) cable.

Meanwhile, the cable above is merely an example, and may be a digital visual interface (DVI) cable and a low voltage differential signals (LVDS) cable. In addition, the cable may be an optical cable.

In addition, the interface 210 may be connected to the modular display apparatus 100' via wireless communication. In this case, the interface 210 may include a Wi-Fi chip, a Bluetooth chip, a wireless communication chip, or the like.

The interface 210 may be connected to the modular display apparatus 100' through each of a plurality of ports.

Figure 3:
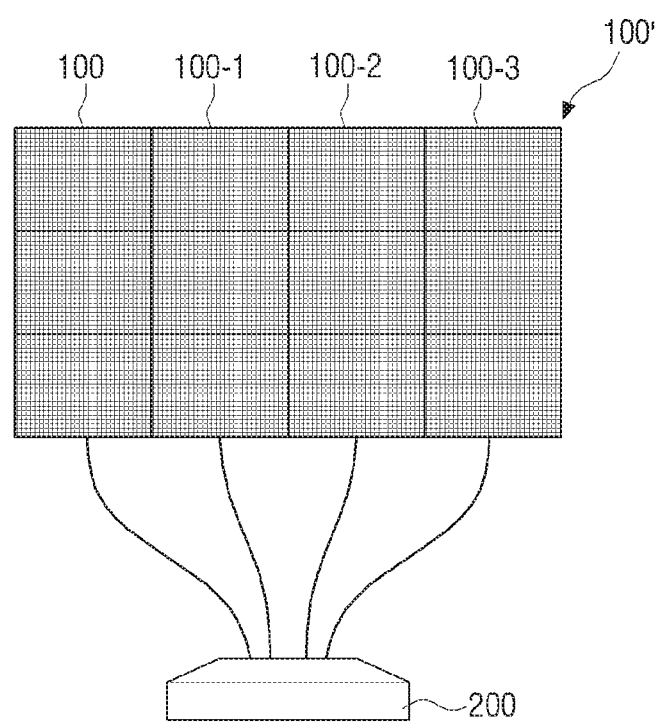
FIG. 3 is a view illustrating a connection structure between the electronic apparatus and the modular display apparatus, according to an embodiment.

For example, as shown in FIG. 3, when each of the cabinets 100, 100-1, 100-2, and 100-3 in which the display modules are arranged in a 1×3 format is coupled in a 4×1 format, the interface 210 may be connected to each cabinet through each of the plurality of ports. For this purpose, the interface 210 may include at least four ports that may be connected to each of the plurality of cabinets 100, 100-1, 100-2, and 100-3.

That is, the interface 210 may include a first port connected to the first cabinet 100, a second port connected to a second cabinet 100-1, a third port connected to a third cabinet 100-2, and a fourth port connected to a fourth cabinet 100-3.

The number of ports is merely an example, and the number of ports may increase or decrease according to embodiments.

According to an embodiment in which each of the cabinets 100, 100-1, 100-2, and 100-3 and the display modules are arranged in a 1×3 format, each of the plurality of ports are connected to each of the each of the cabinets 100, 100-1, 100-2, and 100-3, but each of the plurality of ports may be connected to each of a plurality of display module groups included in one cabinet.

For example, when the plurality of display modules included in the cabinet are arranged in a 4×4 format, four display module groups that are divided in a vertical direction may be connected to each of the plurality of ports of the electronic apparatus 200. This will be described in greater detail later.

The processor 220 controls overall operations of the electronic apparatus 200. For this purpose, the processor 220 may include one or more of a central processing unit (CPU), an application processor (AP), or a communication processor (CP).

The processor 220 may scale an image signal to a predetermined resolution. For example, the processor 220 may upscale an image signal received from an external device or an image stored in a storage to a predetermined resolution.

Here, the external device may be a server, a set-top box, a USB storage, a PC, a smart phone, or the like. The predetermined resolution may be 4K resolution, which may be provided in a display apparatus of which width to height resolution is 3,840×2,160, and the number of pixels is 8,294,400, or 8K resolution which may be provided in a display apparatus of which width to height resolution is 7,680×4,320, and the number of pixels 33,177,600.

According to an embodiment, when the image signal of 4K resolution is received from an external device, the processor 220 may upscale the resolution of the received image signal to 8K.

This is merely an example, and the predetermined resolution may change in a diverse manner according to a user input.

The processor 220 may transmit the upscaled image signal to the modular display apparatus 100' via the interface 210.

Meanwhile, as described above, the modular display apparatus 100' may be implemented as the modular display apparatus 100' such as a video wall in which the plurality of cabinets 100, 100-1, 100-2, and 100-3 are coupled. For example, the modular display apparatus 100' has a structure in which the cabinets having a width to height resolution of 3,840×2,160 are arranged in a 2×2 format, and may be implemented as a display apparatus capable of providing an image having width to height resolution of 7,680×4,320.

The processor 220 may divide a plurality of display modules included in the modular display apparatus 100' into a plurality of groups in a vertical direction.

Specifically, the processor 220 may divide a plurality of display modules into a plurality of groups in a vertical direction, based on the number of ports connected to the modular display apparatus 100'.

For example, as illustrated in FIG. 3, when the first cabinet 100 is connected through the first port, the second cabinet 100-1 is connected through the second port, the third cabinet 100-2 is connected through the third port, and the fourth cabinet 100-3 is connected through the fourth port, the processor 220 may divide the plurality of display modules into four groups.

Here, the first group may be a plurality of display modules included in the first cabinet 100, the second group may be a plurality of display modules included in the second cabinet 100-1, the third group may be a display module included in the third cabinet 100-2, the fourth group may be a plurality of display modules included in the fourth cabinet 100-3.

The processor 220 may decompose the upscaled image signal into image signals corresponding to each of the plurality of groups. Here, the decomposed image signal refers to a signal that is obtained by decomposing an image frame of the upscaled image signal based on the position and the number of each group.

For example, as illustrated in FIG. 3, when four groups are connected from the left to the right, the processor 220 may divide the image frame of the upscaled image signal into four parts from the left to the right.

At this time, the processor 220 may divide the image frame of the upscaled image signal based on sizes of each of the plurality of groups.

For example, when the size of each group is 1 m in width and 2 m in height, the processor 220 may divide the image frame of the upscaled image signal into four image frames of which width to height ratio is 1:2.

Then, the processor 220 may transmit the decomposed image signals (that is, signals corresponding to the divided image frames) through each of the plurality of ports to each of the plurality of groups. In the above-described embodiment, the processor 220 may transmit to the first group the decomposed image signals corresponding to the first group through the first port, transmit to the second group the decomposed image signals corresponding to the second group through the second port, transmit to the third group the decomposed image signals corresponding to the third group through the third port, and transmit to the fourth group the decomposed image signals corresponding to the fourth group through the fourth port.

The processor 220 may encode the decomposed image signals corresponding to each of a plurality of groups in a unit of rows, and transmit the image signals encoded in a unit of rows to each of the plurality of groups.

Figure 4:
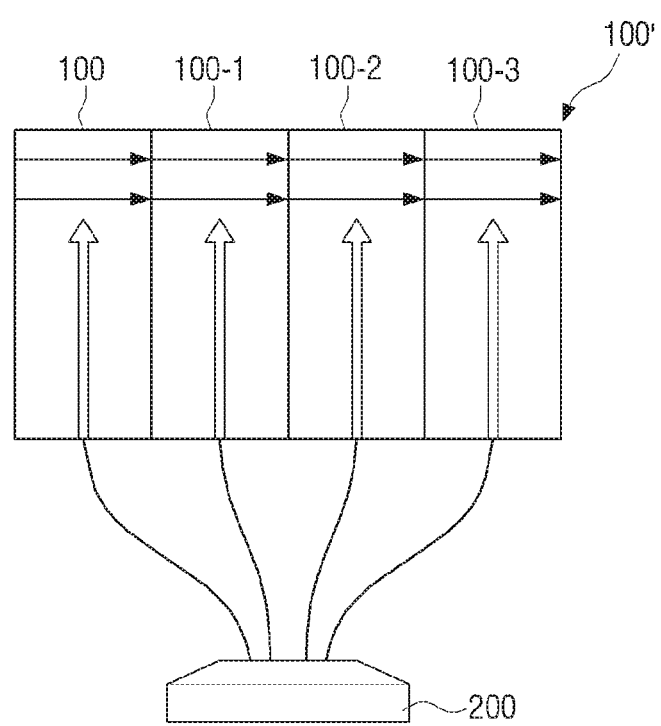
FIG. 4 is a view illustrating an operation of the electronic apparatus to transmit an image signal to each of a plurality of groups, according to an embodiment.

For example, as illustrated in FIG. 4, the processor 220 may transmit the image signal which is encoded in a unit of rows to each of a plurality of groups.

The signal processing process of the modular display apparatus 100 will be described in greater detail with reference to FIG. 5.

As such, by decomposing and transmitting the upscaled image signal, the electronic apparatus according to an embodiment may provide a high-resolution image to the modular display apparatus even through an interface having a small channel bandwidth.

The processor 220 may perform vertical synchronization (V-sync) to the decomposed image signal above, and transmit the synchronized image signal to each of the plurality of groups.

Specifically, when each of the plurality of groups displays an image corresponding to the received image signals, the processor 220 may perform the V-sync for each of the decomposed image signals so that the same image frame may be displayed at the same timing, and transmit the V-sync image signal to each of the plurality of groups.

Figure 5:
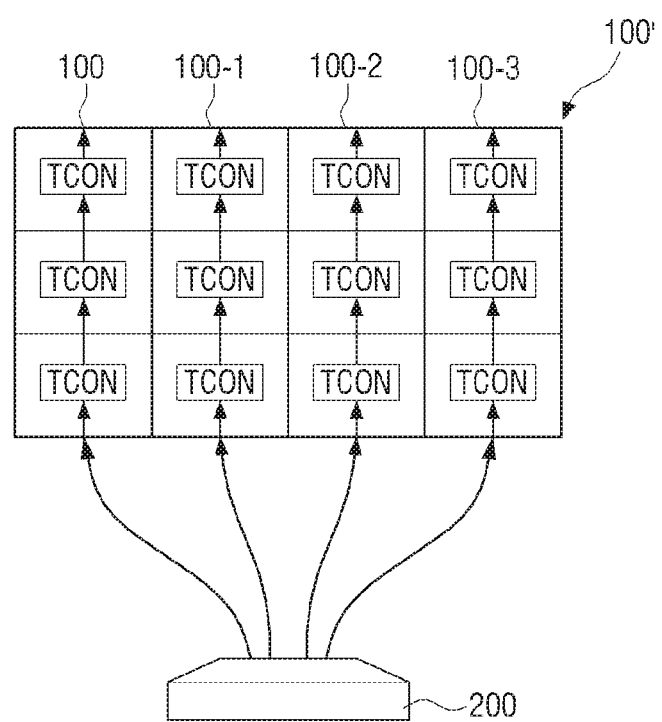
FIG. 5 is a view illustrating a method for image processing of the modular display apparatus, according to an embodiment.

FIG. 5 is a view illustrating a method for image processing of the modular display apparatus according to an embodiment.

Each of the plurality of ports of the electronic apparatus 200 may be connected to each of the display modules positioned at an outer side, from among the display modules belonging to each of the plurality of groups.

For example, referring to FIG. 5, each of the plurality of ports may be connected to each of the display modules positioned at a lower side, among the display modules belonging to each of the plurality of groups.

Accordingly, the processor 220 may transmit, through each of the plurality of ports, the decomposed image signals to each of the display modules located at the lower side among a plurality of display modules belonging to each group.

In this case, each of the display modules positioned at the lower side may transmit the decomposed image signals received from the electronic apparatus 200 to the display module located at an upper side.

To be specific, the plurality of display modules included in each group may be connected to each other by a daisy-chain method, and the display modules located at the lower side may transmit the decomposed image signals to the display modules positioned at the upper side.

By this method, when the decomposed image signal is transmitted to the display module which is located at a top side, a timing controller (T-CON) included in the top side of the display module may decode the received image signals, crop an image corresponding to the position, and reproduce the image through the display module.

In the case of the display module located at a lower side of the display module at the top side, if the image signal which is decomposed by the same method is transmitted, the received image signal may be decoded through the T-CON, and the T-CON may crop the image corresponding to the display module and reproduce the image.

The signal processing may be performed simultaneously in each of a plurality of groups. That is, unlike a related-art modular display apparatus that processes image signals from the upper left to the upper right of the modular display apparatus into one line, the modular display apparatus 100' according to an embodiment may receive the decomposed image signals from the electronic apparatus 200, and each of the plurality of groups may decode the received image signals and reproduce the image simultaneously.

According to an embodiment, the plurality of display modules included in the modular display apparatus 100' is divided into a plurality of groups in a vertical direction, and the upscaled image signal is decomposed to the image signal corresponding to each of the plurality of groups.

The processor 220 may divide the plurality of display modules included in the modular display apparatus to a plurality of groups in a vertical direction and a horizontal direction, and decompose the upscaled image signal to image signal corresponding to each of the plurality of groups.

Hereinafter, an embodiment will be described with reference to FIGS. 6A, 6B, and 7.

Figure 6A:
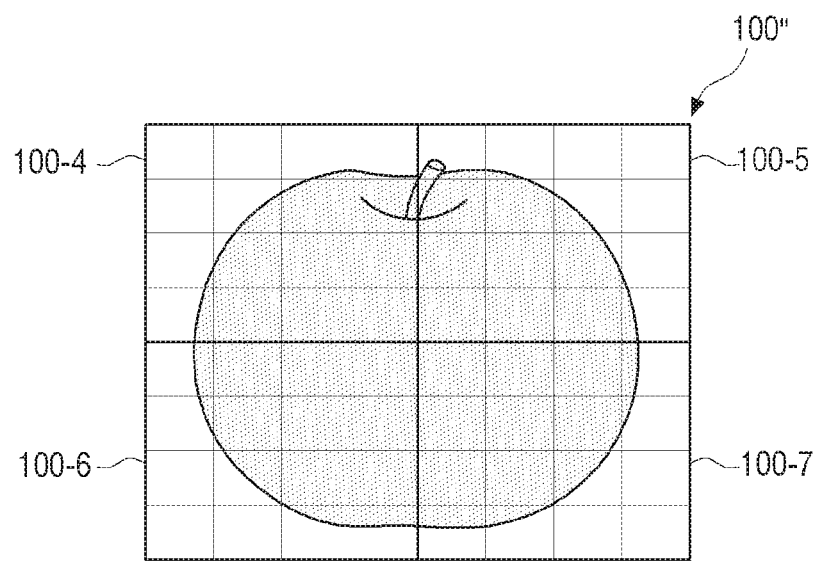
FIG. 6A is a view illustrating a connection structure between the electronic apparatus and the modular display apparatus, according to an embodiment.
Figure 6B:
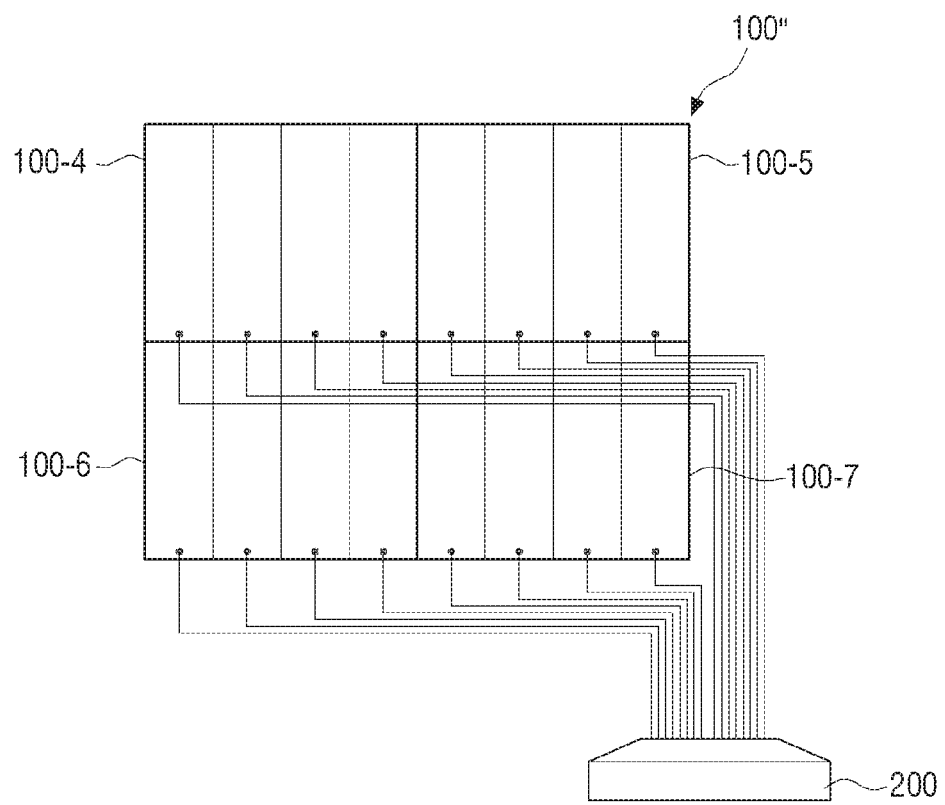
FIG. 6B is a view illustrating a connection structure between the electronic apparatus and the modular display apparatus, according to an embodiment.

FIGS. 6A and 6B are views illustrating a connection structure between the electronic apparatus and the modular display apparatus according to an embodiment.

As illustrated in FIG. 6A, in the case of a modular display apparatus 100", in which each cabinet 100-4, 100-5, 100-6, and 100-7, where display modules are arranged in a 4×4 format, is coupled in a 2×2 format, the electronic apparatus 200 and the modular display apparatus 100" may be connected as illustrated in FIG. 6B.

Specifically, referring to FIG. 6B, at a back of the modular display apparatus 100", a plurality of connectors that may be connected to each of the plurality of ports of the electronic apparatus 200 may be included. In addition, each connector of the modular display apparatus 100" may be connected to each of the plurality of ports of the electronic apparatus 200.

In this case, the processor 220 may divide a plurality of display modules into a plurality of groups in a vertical direction and a horizontal direction, based on the number of ports connected to the modular display apparatus 100", and each position of the ports connected to the modular display apparatus 100".

For example, as illustrated in FIG. 6B, when the first cabinet 100-4 and the second cabinet 100-5 are connected to the ports provided in the first area of the electronic apparatus 200, the processor 220 may divide the plurality of display modules included in the first cabinet 100-4 and the second cabinet 100-5 to a group located at an upper side, based on division of the modular display apparatus 100" in the horizontal direction.

As illustrated in FIG. 6B, when the third cabinet 100-6 and the fourth cabinet 100-7 are connected to the ports provided in the second area of the electronic apparatus 200, the processor 220 may divide the plurality of display modules included in the third and fourth cabinets 100-6 and 100-7 to be a group located in the lower side when the modular display apparatus 100" is divided in a horizontal direction.

The processor 220 may divide each group that is divided in a horizontal direction into a plurality of sub-groups in a vertical direction, based on the number of the ports of each area connected to the modular display apparatus 100".

Specifically, the processor 220 may divide the groups located in an upper side to a plurality of sub-groups in a vertical direction, based on the number of the ports in the first area connected to the modular display apparatus 100".

As such, the processor 220 may divide the groups located in a lower side into a plurality of sub-groups in a vertical direction, based on the number of the ports in the second area connected to the modular display apparatus 100".

For example, when the modular display apparatus 100" and the electronic apparatus 200 are connected as shown in FIG. 6B, the processor 220 may divide the groups connected to the first port to the eighth port in the first area into first to eighth sub-groups that are located in an upper side in a horizontal direction and located from left to right side in a vertical direction, and divide the groups connected to the ninth to 16th ports to the ninth to 16th sub-groups located in a lower side in a horizontal direction and located from left to right in a vertical direction.

In the embodiment above, the processor 220 may divide the image frame of the upscaled image signal into two from an upper side to a lower side, and into 16 image frames by dividing the image frame into eight from the left to right.

Then, the processor 220 may transmit the decomposed image signal to each of the plurality of sub-groups through each of the plurality of the ports.

Specifically, the processor 220 may encode the decomposed image signals corresponding to each of the plurality of sub-groups in a unit of rows, and transmit the image signals that are encoded in a unit of rows to each of the sub-groups.

Figure 7:
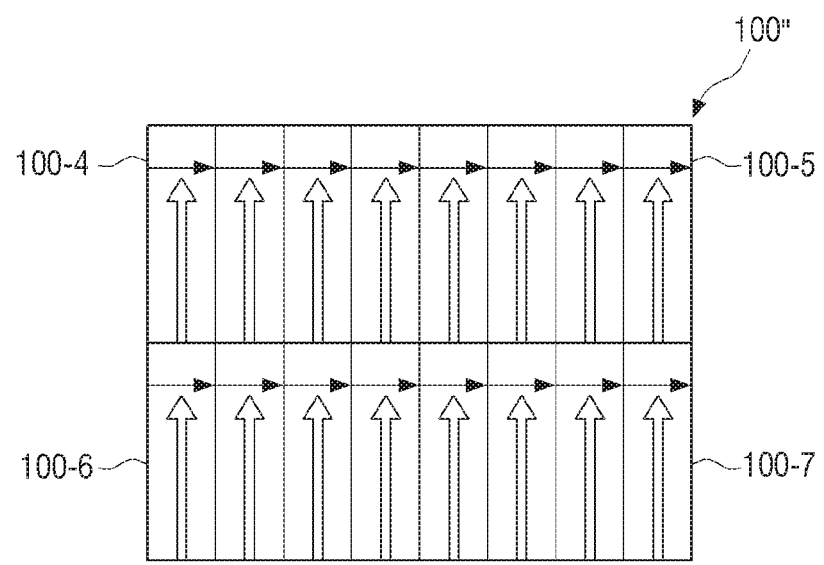
FIG. 7 is a view illustrating an operation of the electronic apparatus to transmit an image signal to each of the plurality of sub-groups, according to an embodiment.

For example, as illustrated in FIG. 7, the processor 220 may transmit the image signals encoded in a unit of rows to each of the plurality of sub-groups.

As such, by dividing the modular display apparatus 100" into a plurality of sub-groups in a vertical direction and a horizontal direction, the electronic apparatus 200 according to an embodiment may provide a high-resolution image to the modular display apparatus even through an interface having a small channel bandwidth.

According to an embodiment, a plurality of display modules are divided into a plurality of groups in a vertical direction and a horizontal direction, based on the number and position of the ports connected to the modular display apparatus, but the method of dividing the display modules into a plurality of groups is not limited thereto.

In the above description, the plurality of display modules are divided into a plurality of groups in the horizontal direction, and then the groups divided in the horizontal direction are divided into a plurality of sub-groups in the vertical direction, but the order is not necessarily limited thereto. That is, in the disclosure, a plurality of display modules may be divided into a plurality of groups in the vertical direction, and the groups divided in the vertical direction may be divided into a plurality of sub-groups in the horizontal direction.

Figure 8A:
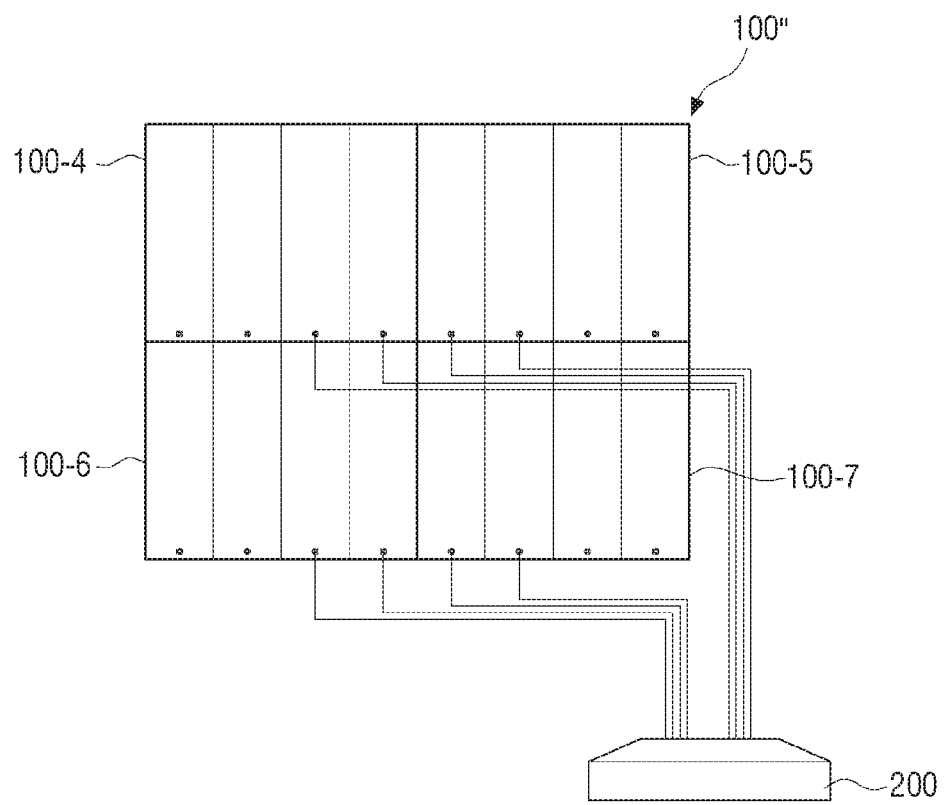
FIG. 8A is a view illustrating an embodiment of a resolution of an image so that the electronic apparatus corresponds to the screen size of the modular display apparatus, according to an embodiment.
Figure 8B:
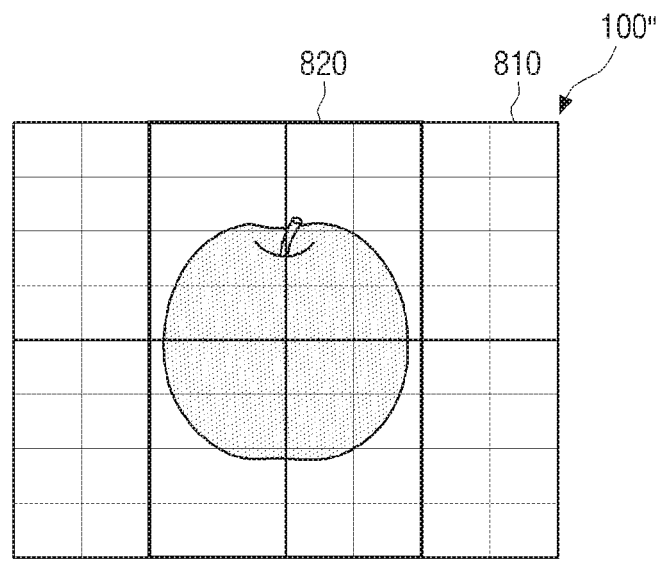
FIG. 8B is a view illustrating an embodiment of a resolution of an image so that the electronic apparatus corresponds to the screen size of the modular display apparatus, according to an embodiment.

FIGS. 8A and 8B are views illustrating an embodiment of a resolution of an image so that the electronic apparatus corresponds to the screen size of the modular display apparatus according to an embodiment.

As described above, the modular display apparatus according to an embodiment may upscale the image signal and provide the upscaled image signal through each of the plurality of groups.

According to an embodiment, when the image signal of 4K resolution is received from an external device, the processor 220 may upscale the resolution of the received image signal to 8K, and provide the upscaled image signal through each of the plurality of groups.

According to an embodiment, the modular display apparatus is implemented as a display apparatus of which width to height resolution is 7680×4320 and the number of pixels is 33,177,600, and the resolution of the upscaled image signal corresponds to the resolution of the modular display apparatus.

However, in some cases, the resolution of the upscaled image signal and the resolution of the modular display apparatus may not correspond to each other.

For example, as illustrated in FIG. 8A, even though the modular display apparatus 100" has the 8K resolution, when only a part of the plurality of display groups included in the modular display apparatus 100" is connected to the electronic apparatus 200, the resolution of the upscaled image and the resolution of the modular display apparatus may not be the same. Alternatively, when the modular display apparatus is implemented as a display apparatus which may not support 8K resolution, the resolution of the upscaled image and the resolution of the modular display apparatus may not be the same.

In this case, the processor 220 may identify the resolution of the image which may be provided by the plurality of sub-groups connected to each of the plurality of the ports, and rescale the image scale which is scaled to the predetermined resolution to correspond to the identified resolution.

Here, the processor 220 may identify the resolution of the image which may be provided by the plurality of sub-groups connected to each of the plurality of ports, based on the number of pixels included in the plurality of sub-groups connected to each of the plurality of ports.

For example, if it is identified that the resolution of the scaled image is 8K and the resolution of the image that may be provided by the plurality of sub-groups connected to each of the plurality of ports is 6K, the processor 220 may rescale the scaled image signal to correspond to 6K resolution.

In addition, the processor 220 may decompose the rescaled image signal to the image signal corresponding to each of the plurality of sub-groups, and transmit the decomposed image signal to each of the plurality of sub-groups through the ports connected to each of the plurality of sub-groups.

Accordingly, as illustrated in FIG. 8B, the modular display apparatus including display modules 810 may display an image 820 which corresponds to a screen of the modular display apparatus. The plurality of groups divided in the vertical direction may be divided further into a plurality of sub-groups in a horizontal direction.

A black image may be provided to a group which is not connected to the electronic apparatus 200, among a plurality of display groups.

Figure 9:
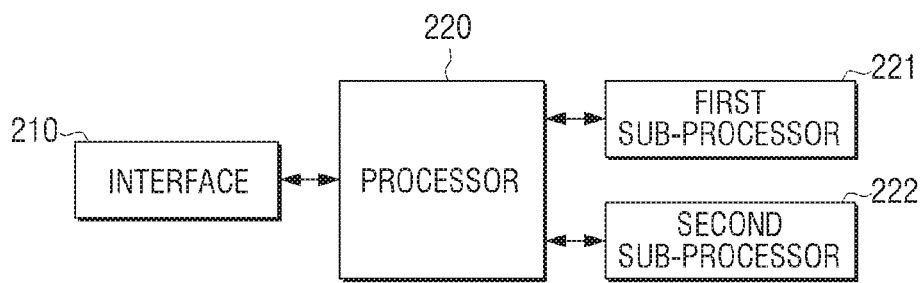
FIG. 9 is a detailed block diagram illustrating the electronic apparatus, according to an embodiment.

FIG. 9 is a detailed block diagram illustrating the electronic apparatus according to an embodiment.

Referring to FIG. 9, the electronic apparatus 200 according to an embodiment may include the interface 210, the processor 220, a first sub-processor 221, and a second sub-processor 222.

The processor 220 may divide a plurality of display modules included in the modular display apparatus into a plurality of groups in a horizontal direction.

Specifically, the display modules positioned at an upper side in a horizontal direction of the modular display apparatus may be divided into the first group, and the display modules positioned at a lower side may be divided into the second group.

The processor 220 may divide the up-scaled image signal into image signals corresponding to the first and second groups, transmit the image signals corresponding to the first group to the first sub-processor 221, and transmit the image signal corresponding to the second group to the second sub-processor 222.

The first sub-processor 221 may divide the first group into a plurality of sub-groups in the vertical direction.

To be specific, the first sub-processor 221 may divide the first group into a plurality of sub-groups in the vertical direction, based on the number of the ports provided in the first area connected to the modular display apparatus.

The first sub-processor 221 may decompose the image signals corresponding to the first group into the image signals corresponding to the plurality of sub-groups and transmit the decomposed image signals to each of the plurality of sub-groups through the ports connected to each of the plurality of sub-groups.

The second sub-processor may divide the second group into a plurality of sub-groups in the vertical direction.

Specifically, the second sub-processor 222 may divide the second group into a plurality of sub-groups in the vertical direction, based on the number of ports provided in the second area connected to the modular display apparatus.

The second sub-processor 222 may decompose the image signal corresponding to the second group to the image signals corresponding to the plurality of sub-groups, and transmit the decomposed image signals to each of the plurality of sub-groups through the ports connected to each of the plurality of sub-groups.

Figure 10:
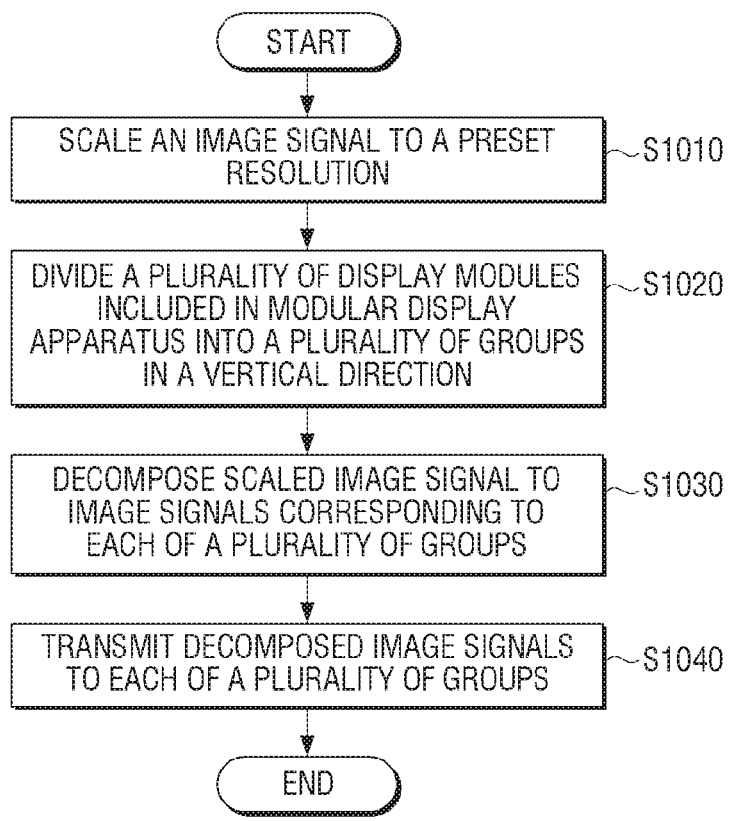
FIG. 10 is a flowchart illustrating an operation of the electronic apparatus according to an embodiment.

FIG. 10 is a flowchart illustrating an operation of the electronic apparatus according to an embodiment.

The electronic apparatus may upscale the image signal to a predetermined resolution in step S1010. To be specific, the electronic apparatus may upscale the image signal received from an external device or an image stored in the storage to a predetermined resolution.

Here, the predetermined resolution may be 4K resolution or 8K resolution, but this is merely an example, and the predetermined resolution may change in a diverse manner according to a user input.

The electronic apparatus may divide a plurality of display modules included in the modular display apparatus into a plurality of groups in the vertical direction in step S1020. Specifically, the electronic apparatus may divide a plurality of display modules into a plurality of groups in the vertical direction, based on the number of ports connected to the modular display apparatus.

The electronic apparatus may decompose the upscaled image signal into image signals corresponding to the plurality of groups in step S1030. Here, the decomposed image signal refers to a signal obtained by decomposing the image frame of the upscaled image signal based on the position and the number of each group.

Thereafter, the electronic apparatus may transmit the image signal to each of the plurality of groups in step S1040. The electronic apparatus may encode the decomposed image signals corresponding to each of the plurality of groups in a unit of rows, and transmit the image signals encoded in a unit of rows to each of the plurality of groups.

A non-transitory computer readable medium which stores a program for sequentially executing a method for controlling an electronic apparatus according to an embodiment may be provided.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are merely examples and are not to be construed as limiting the disclosure. The present teaching can be readily applied to other types of apparatuses. Also, the description of the embodiments of the disclosure is intended to be illustrative, and not to limit the scope of the claims, and many alternatives, modifications, and variations will be apparent to those skilled in the art. While one or more embodiments have been described with reference to the figures, it will be understood by those of ordinary skill in the art that various changes in form and details may be made therein without departing from the spirit and scope as defined by the following claims and their equivalents.

What is claimed is:

1. A modular display system comprising:
an electronic apparatus; and
a modular display apparatus connected to the electronic apparatus,
wherein the electronic apparatus comprises:
a processor, and
an interface connected to the modular display apparatus,
wherein the modular display apparatus includes a plurality of display modules arranged as a plurality of groups,
wherein each of the plurality of groups is formed as a plurality of sub-groups,
wherein the interface is connected to only a part of the plurality of display modules, the part of the plurality of display modules being display modules among the plurality of display modules and corresponding to a number of sub-groups among the plurality of sub-groups, and
wherein the processor is configured to:
scale an image signal received from an external device to a scaled image signal according to a predetermined resolution,
decompose the scaled image signal to a plurality of group signals corresponding to the plurality of groups,
decompose each of the plurality of group signals to a number of decomposed sub-group signals corresponding to the number of sub-groups among the plurality of sub-groups in each of the plurality of groups, and
transmit the number of decomposed sub-group signals to the number of sub-groups among the plurality of sub-groups via the interface,
wherein display modules included in each of the plurality of sub-groups are configured to be connected to each other so that a display module positioned at a lower side relatively in each of the plurality of sub-groups transmits the number of decomposed sub-group signals to a display module positioned at an upper side relatively in each of the plurality of sub-groups, and
wherein each of the display modules included in each of the plurality of sub-groups is configured to obtain an image of a corresponding position by decoding a decomposed sub-group signal and display the obtained image.

2. The modular display system of claim 1, wherein the interface comprises a plurality of ports connected to the number of sub-groups of the modular display apparatus.

3. The modular display system of claim 2, wherein the processor is further configured to:
identify a resolution of an image provided by the number of sub-groups connected to the plurality of ports, and rescale the scaled image signal to the identified resolution.

4. The modular display system of claim 1, wherein the processor is further configured to encode the number of decomposed sub-group signals corresponding to the number of sub-groups into rows, and sequentially transmit the number of encoded decomposed sub-group signals to the number of sub-groups.

5. The modular display system of claim 1, wherein the processor is further configured to vertically synchronize the number of decomposed sub-group signals and transmit the vertically synchronized signals to the number of sub-groups.

6. The modular display system of claim 1, further comprising:
a first sub-processor; and
a second sub-processor,
wherein the plurality of display modules are formed as a first group and a second group,
wherein the processor is further configured to:
decompose the scaled image signal to a first image signal corresponding to the first group and a second image signal corresponding to the second group, transmit the first image signal corresponding to the first group to the first sub-processor, and transmit the second image signal corresponding to the second group to the second sub-processor,
wherein the first group includes a plurality of first sub-groups,
wherein the first sub-processor is configured to:
decompose the first image signal corresponding to the first group, transmit the decomposed first image signal corresponding to the first group to the plurality of first sub-groups via the interface connected to the plurality of first sub-groups, wherein the second group includes a plurality of second sub-groups, and wherein the second sub-processor is configured to:

decompose the second image signal corresponding to the second group, and transmit the decomposed second image signal corresponding to the second group to the plurality of second sub-groups via the interface connected to the plurality of second sub-groups.

7. A method for controlling a modular display system comprising an electronic apparatus and a modular display apparatus connected to the electronic apparatus, wherein the electronic apparatus comprises an interface connected to the modular display apparatus and the modular display apparatus includes a plurality of display modules arranged as a plurality of groups, and each of the plurality of groups is formed as a plurality of sub-groups, wherein the interface is connected to only a part of the plurality of display modules, the part of the plurality of display modules being display modules among the plurality of display modules and corresponding to a number of sub-groups among the plurality of sub-groups, wherein the method comprises:

scaling an image signal received from an external device to a scaled image signal according to a predetermined resolution, decomposing the scaled image signal to a plurality of group signals corresponding to the plurality of groups, decomposing each of the plurality of group signals to a number of decomposed sub-group signals corresponding to the number of sub-groups among the plurality of sub-groups in each of the plurality of groups, and transmitting the number of decomposed sub-group signals to the number of sub-groups among the plurality of sub-groups via the interface, wherein display modules included in each of the plurality of sub-groups are configured to be connected to each other so that a display module positioned at a lower side relatively in each of the plurality of sub-groups transmits the number of decomposed sub-group signals to a display module positioned at an upper side relatively in each of the plurality of sub-groups, and wherein each of the display modules included in each of the plurality of sub-groups is configured to obtain an image of a corresponding position by decoding a decomposed sub-group signal and display the obtained image.

8. The method of claim 7, wherein the interface comprises a plurality of ports connected to the number of sub-groups of the modular display apparatus.

9. The method of claim 8, wherein the method further comprises identifying a resolution of an image provided by the number of sub-groups connected to the plurality of ports, and rescaling the scaled image signal to the identified resolution.

10. The method of claim 7, wherein the transmitting comprises encoding the number of decomposed sub-group signals corresponding to the number of sub-groups into rows, and sequentially transmitting the encoded signals to the number of sub-groups.

11. The method of claim 7, wherein the transmitting comprises vertically synchronizing the number of decomposed sub-group signals and transmitting the vertically synchronized signals to the number of sub-groups.

12. The method of claim 7, wherein a resolution of the image signal received from the external device is 4K, and the predetermined resolution is 8K.

13. A modular display system comprising:

an electronic apparatus; and a modular display apparatus connected to the electronic apparatus, wherein the electronic apparatus comprises:

a processor, and an interface connected to the modular display apparatus, wherein the modular display apparatus includes a plurality of display modules arranged as a plurality of groups in a first direction and each of the plurality of groups is formed as a plurality of sub-groups in a second direction, and only a part of the plurality of sub-groups is connected to the interface, the part of the plurality of sub-groups being display modules among the plurality of display modules and corresponding to a number of sub-groups among the plurality of sub-groups, wherein the processor is configured to:

identify a resolution of an image provided by a the number of sub-groups among the plurality of sub-groups and connected to a plurality of ports of the interface, receive an image signal from an external device having a predetermined resolution, based on identifying that the predetermined resolution is different than the resolution of the image provided by the number of sub-groups connected to the plurality of ports, change the predetermined resolution of the image signal to correspond to the resolution of the image provided by the number of sub-groups, decompose the changed image signal to a plurality of group signals corresponding to the plurality of groups, decompose each of the plurality of group signals to a plurality of decomposed sub-group signals corresponding to the plurality of ports, and transmit the plurality of decomposed sub-group signals to the number of sub-groups through the plurality of ports, wherein display modules included in each of the plurality of sub-groups are configured to connect to each other so that a display module positioned at a lower side relatively in each of the plurality of sub-groups transmits the plurality of decomposed sub-group signals to a display module positioned at an upper side relatively in each of the plurality of sub-groups, and wherein each of the display modules included in each of the plurality of groups is configured to obtain an image of a corresponding position by decoding a decomposed sub-group signal and display the obtained image.

14. The modular display system of claim 13, wherein the first direction is a vertical direction and the second direction is a horizontal direction.

15. The modular display system of claim 13, wherein each of the plurality of decomposed sub-group signals are transmitted simultaneously.

\* \* \* \* \*